US 8,855,876 B2

(12) United States Patent
Robinson

(10) Patent No.: US 8,855,876 B2
(45) Date of Patent: Oct. 7, 2014

(54) SYSTEM AND METHOD FOR MANAGING AN OPERATING TEMPERATURE OF A WORKING FLUID IN A VEHICLE POWERTRAIN

(75) Inventor: James Robinson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 13/188,177

(22) Filed: Jul. 21, 2011

(65) Prior Publication Data

US 2013/0024080 A1  Jan. 24, 2013

(51) Int. Cl.
    *G06F 17/00* (2006.01)
    *B60W 30/184* (2012.01)
    *B60W 10/10* (2012.01)
    *F16H 57/04* (2010.01)
    *B60W 10/06* (2006.01)

(52) U.S. Cl.
    CPC .... *F16H 57/0413* (2013.01); *B60W 2710/0677* (2013.01); *B60W 30/1843* (2013.01); *B60W 2710/1061* (2013.01); *B60W 10/10* (2013.01); *B60W 2510/107* (2013.01); *B60W 10/06* (2013.01); *B60W 2720/10* (2013.01)
    USPC .................. 701/54; 701/53; 477/98

(58) Field of Classification Search
    CPC ........................... F16H 59/72; F02D 2200/023
    USPC .............................................. 701/54; 477/98
    See application file for complete search history.

(56) References Cited

U.S. PATENT DOCUMENTS

| | | | | |
|---|---|---|---|---|
| 4,733,581 A | * | 3/1988 | Hasegawa et al. | 477/98 |
| 4,914,982 A | | 4/1990 | Ito et al. | |
| 5,070,832 A | * | 12/1991 | Hapka et al. | 123/198 D |
| 5,601,511 A | * | 2/1997 | Michioka | 477/98 |
| 6,146,309 A | * | 11/2000 | Nishino et al. | 477/98 |
| 7,548,811 B2 | | 6/2009 | Chida et al. | |
| 2003/0233186 A1 | | 12/2003 | Chess | |
| 2007/0185629 A1 | | 8/2007 | Kikuchi | |
| 2008/0077297 A1 | | 3/2008 | Ito et al. | |
| 2008/0181280 A1 | | 7/2008 | Wang et al. | |

(Continued)

FOREIGN PATENT DOCUMENTS

| | | |
|---|---|---|
| JP | 04-258570 A | 9/1992 |
| JP | 2004-019891 A | 1/2004 |
| JP | 2004-190492 A | 7/2004 |

OTHER PUBLICATIONS

Copy of International Search Report for PCT/US12/40766 dated Aug. 24, 2012.

*Primary Examiner* — Helal A Algahaim
*Assistant Examiner* — Kelly E Darby
(74) *Attorney, Agent, or Firm* — Kenealy Vaidya LLP

(57) ABSTRACT

A system for managing a temperature of a working fluid in a vehicle powertrain can include a temperature sensor and a controller. The working fluid can be located in a transmission of the powertrain, and a temperature sensor can be in thermal contact with the working fluid and configured to output data indicative of a real-time temperature of the working fluid. The controller can be in electrical communication with the temperature sensor and at least one of a power source and the transmission. The controller can be configured to compare the data from the temperature sensor to a temperature threshold, select a terminal speed limit when the data indicates that the temperature is less than or substantially equal to the temperature threshold, and select a reduced speed limit when the data indicates that the temperature is greater than the temperature threshold.

16 Claims, 2 Drawing Sheets

(56) References Cited

U.S. PATENT DOCUMENTS

| | | | |
|---|---|---|---|
| 2008/0201036 A1* | 8/2008 | Karlsson | 701/35 |
| 2008/0312034 A1* | 12/2008 | Shultz et al. | 477/98 |
| 2009/0112435 A1* | 4/2009 | Meyers et al. | 701/78 |
| 2010/0087997 A1 | 4/2010 | Tsukamoto et al. | |
| 2010/0195693 A1 | 8/2010 | Kitajima | |
| 2010/0313849 A1 | 12/2010 | Stoner et al. | |
| 2011/0015037 A1 | 1/2011 | Koenig | |

* cited by examiner

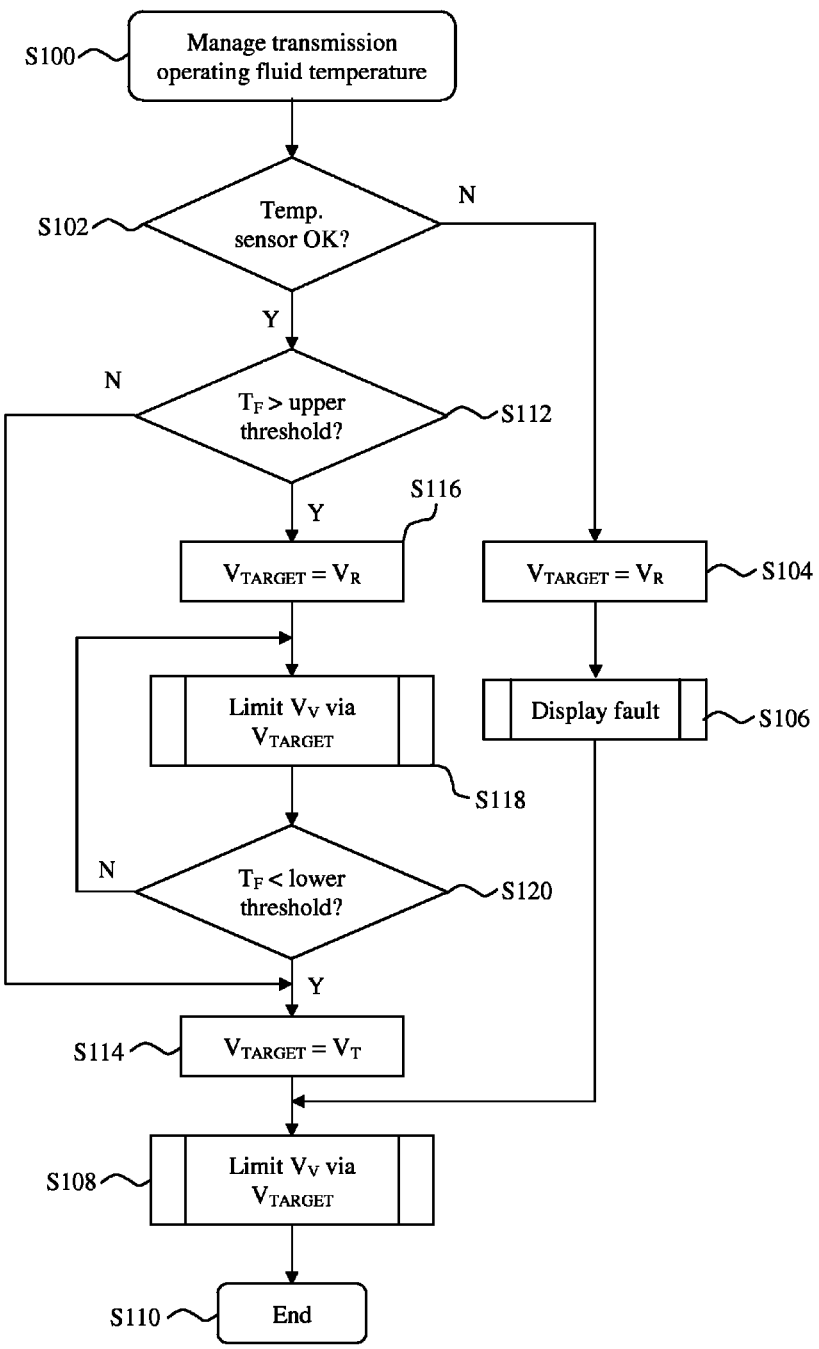

SYSTEM AND METHOD FOR MANAGING AN OPERATING TEMPERATURE OF A WORKING FLUID IN A VEHICLE POWERTRAIN

BACKGROUND

1. Field

The presently disclosed subject matter relates to devices, systems, and processes useful in managing an operating temperature of a working fluid, especially for working fluid used in a vehicle.

2. Description of the Related Art

Existing vehicles can include a multiple gear ratio transmission that can multiply the torque output by a power source such as an internal combustion engine (ICE), a hybrid of an ICE and an electric motor, electric motor, hydrogen motor and the like. The transmission can contain various types of working fluid, such as hydraulic oil, that can be used to lubricate and/or cool the internal components of the transmission and/or other high friction systems and structures. For example, the working fluid can be used in the selection of an appropriate one of a plurality of gear ratios of the transmission, where the transmission is configured as an automatic transmission or as a semi-automatic transmission.

Under certain conditions, the operating temperature of the working fluid can increase, which in turn, can cause the fluid pressure to increase. Any pressure in excess of a threshold pressure can affect the operation and/or components of the transmission if the excess pressure is not reduced.

In order to relieve fluid pressure in excess of the threshold pressure, the transmission can include a breather port. When the fluid pressure of the working fluid exceeds the threshold pressure, a volume of the working fluid can be expelled through the breather port in an attempt to relieve the excess fluid pressure. In order to maintain optimal performance of the transmission, the vehicle operator or owner should replace all expelled fluid. This fluid maintenance can be inconvenient in both time and cost to the vehicle owner or operator. Additionally, under extreme conditions, the performance of the transmission can be reduced if the volume of working fluid decreases below a threshold volume. A reduced amount of working fluid can also adversely affect the quality and/or performance of the vehicle as perceived by the owner or operator of the vehicle.

Thus, there is a need to provide a control system and method to manipulate the operating temperature of a working fluid having one or more of the following qualities and/or characteristics: a minimum maintenance cost; a minimum maintenance time; a minimum adverse impact on the quality and/or performance of the vehicle as perceived by the owner or operator of the vehicle; and/or other qualities and characteristics related to working fluid operations.

SUMMARY

According to one aspect of the disclosure, a system for managing a temperature of a working fluid in a vehicle powertrain can include a temperature sensor and a controller. The vehicle powertrain can include a power source configured to output torque and a transmission. The transmission can include the working fluid, can be selectively coupled to the power source and can be configured to multiply and output the torque from the power source. The temperature sensor can be in thermal contact with the working fluid and configured to output data indicative of a real-time temperature of the working fluid. The controller can be in electrical communication with the temperature sensor and at least one of the power source and the transmission. The controller can be configured to: compare the data from the temperature sensor to a temperature threshold; select a terminal speed limit when the data is less than or substantially equal to the temperature threshold; select a reduced speed limit when the data is greater than the temperature threshold, wherein the reduced speed limit is less than the terminal speed limit; and limit the torque output by at least one of the power source and the transmission to limit the speed of the vehicle to the selected one of the terminal speed limit and the reduced speed limit.

According to an aspect of the disclosed subject matter, a method can be employed for managing a temperature of a working fluid in a vehicle powertrain. The vehicle powertrain can include a power source configured to output torque and a transmission. The transmission can include the working fluid, can be selectively coupled to the power source and can be configured to multiply and output the torque from the power source. The method can include: obtaining data indicative of a real-time temperature of the working fluid; comparing the data to a temperature threshold; selecting a terminal speed limit when the data is less than or substantially equal to the temperature threshold; selecting a reduced speed limit when the data is greater than the temperature threshold, wherein the reduced speed limit is less than the terminal speed limit; and limiting the torque output by at least one of the power source and the transmission to limit the speed of the vehicle to the selected one of the terminal speed limit and the reduced speed limit.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 2 is a flowchart depicting an algorithm in accordance with principles of the disclosed subject matter.

DETAILED DESCRIPTION OF EXEMPLARY EMBODIMENTS

Figure 1:
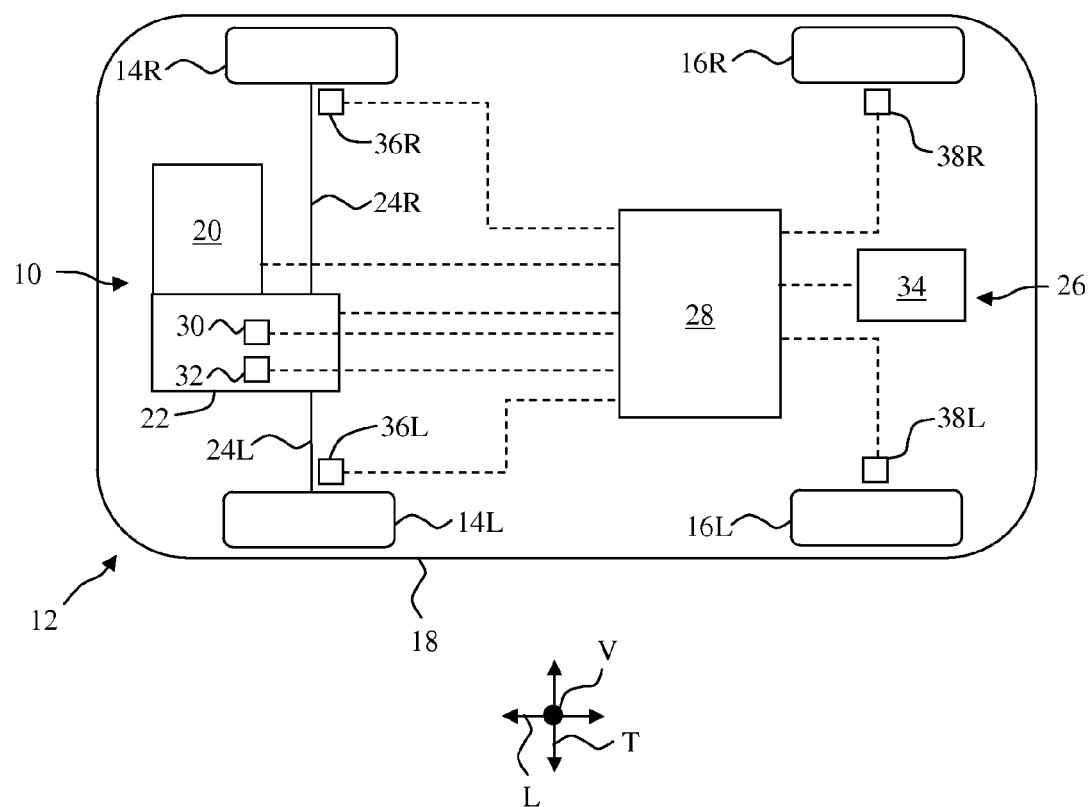
FIG. 1 is a schematic view of a powertrain for a vehicle made in accordance with principles of the disclosed subject matter.

FIG. 1 illustrates an embodiment of a system made in accordance with principles of the disclosed subject matter for managing an operating temperature of a working fluid in a powertrain 10 of a vehicle 12. The vehicle 12 can have a longitudinal direction L, a transverse (or lateral) direction T perpendicular to the longitudinal direction L, and a vertical direction V perpendicular to both the longitudinal direction L and the transverse direction T. The vehicle 12 can include a pair of front wheels 14L, 14R, a pair of rear wheels 16L, 16L, and a main body 18.

The main body 18 can include a passenger compartment and a plurality of operator input components. The passenger compartment can be fully enclosed (for example, as with a truck, sport utility vehicle, sedan, tractor, or the like) or partially enclosed (for example, as with a convertible, a roadster, an All Terrain Vehicle, a motorcycle, a tractor, a golf cart, or the like).

The powertrain 10 can be configured to drive either the front pair of wheels 14L, 14R, the rear pair of wheels 16L, 16R, both pairs 14L, 14R, 16L, 16R, or even a single wheel.

The powertrain 10 can include a power source 20, a transmission 22, a drive output (such as a driveshaft, drive gear, or a pair of driveshafts 24L, 24R), and a control assembly 26.

The powertrain 10 and/or the main body 18 of the vehicle 12 can be configured to permit the vehicle 12 to reach a terminal speed that is limited either by aerodynamic drag or by a signal(s) generated by an electronic control unit and communicated to the power source 20 and/or the transmission 22 to create a governor-limited terminal speed. The governor-limited terminal speed can be less than the drag-limited terminal speed.

The terminal speed limit can be the upper limit of a range of exceptionally high speeds. An exemplary value of this upper limit can be 155 mph (approximately 250 kph), but can be limitless such as in Montana and the German Autobahn. An exemplary value of the lower limit of this range of exceptionally high speeds can be 80 mph (approximately 130 kph) and is usually less, such as 70 mph, and 55 mph.

The transmission 22 can contain a working fluid, such as but not limited to hydraulic oil, that can be used to lubricate and/or cool the internal components of the transmission 22. The working fluid can be used in the selection of an appropriate one of a plurality of gear ratios of the transmission 22, where the transmission 22 is configured as an automatic transmission or as a semi-automatic transmission.

During certain operating condition(s) of the vehicle, such as extended travel by the vehicle 12 at speeds within the exceptionally high speed range, the pressure of the working fluid can exceed a threshold pressure. Accordingly, the transmission 22 can include a breather port (not shown) through which the working fluid can exit the transmission 22 thereby reducing the pressure of the remaining working fluid to a value below the threshold pressure. The threshold pressure can be set at any appropriate value that can provide desired performance, durability, reliability, quality, maintenance and/or other appropriate target characteristic(s) for the transmission 22.

As will be described in detail below, the control assembly 26 can be used to manage the pressure of the working fluid when the vehicle 12 operates under these certain condition(s). Pressure management by the control assembly 26 can minimize the amount of working fluid discharged from the transmission 22 via the breather port due to excess fluid pressure. Thus, the time and cost for maintenance of the vehicle 12 can be reduced and the performance, quality, reliability and durability of the vehicle 12 can be enhanced.

The temperature of the working fluid can be a reliable predictor of when the pressure of the working fluid might exceed the threshold pressure. A threshold temperature can be set at any appropriate value such that the amount of the working fluid discharged via the breather port when the temperature exceeds the threshold temperature is in accordance with the desired performance, durability, reliability, quality, maintenance and/or other appropriate target characteristic(s). For example, the threshold temperature can substantially equal a temperature that directly corresponds to the threshold pressure or it can be set at a value that is less than the temperature that directly corresponds to the threshold pressure. The value of this threshold temperature can vary based on the design specifications of the transmission 22 and the working fluid used therein. An exemplary threshold temperature can be 140° C.

Many factors, singly or in any combination, can cause the temperature of the working fluid to exceed the threshold temperature. By way of example only, prolonged travel of the vehicle 12 at a speed within the range of exceptionally high speeds can cause the temperature of the working fluid to exceed the threshold temperature.

The control assembly 26 can be configured to readily monitor the temperature of the working fluid and regulate the travel speed of the vehicle 12 so that the temperature of the working fluid does not exceed the threshold temperature. The control assembly 26 can include a controller 28, a temperature sensor 30, a transmission output shaft speed sensor 32 and a display 34.

The controller 28 can be in electrical communication with the engine 20, the transmission 22, each of the sensors 30, 32 and the display 34. The controller 28 is typically referred to as an electronic control unit (ECU) or as a central processing unit (CPU). The ECU 28 can be configured with hardware alone, or to run software, that permits the ECU 28 to send, receive, process and store data and to electrically communicate with sensors, manual switches, actuators and/or other ECUs via electrical communication lines (not numbered—shown as dotted lines in FIG. 1). These lines can be in the form of wires or can be in the form of wireless communication signals. Electrical communication can be either one-way communication or two-way communication and can be networked or not networked in any appropriate manner.

The temperature sensor 30 can be mounted within the transmission 22 to be in thermal contact with the working fluid. The temperature sensor 30 can be configured to output data indicative of a real-time temperature of the working fluid. Either the temperature sensor 30 or the ECU 28 can be configured to convert the raw data into a temperature of the working fluid. The temperature sensor 30 can be any sensor capable of providing the appropriate data.

The shaft speed sensor 32 can be adjacent an output shaft (not shown) of the transmission 22. The shaft speed sensor 32 can detect rotation of the output shaft and output data indicative of the rotational speed of the output shaft. Either the shaft speed sensor 32 or the ECU 28 can be configured to convert the raw rotational speed data into a travel speed of the vehicle 12. The shaft speed sensor 32 can be any sensor capable of providing the appropriate data.

The display 34 can be mounted at/within the passenger/driver compartment/seat (or at the control panel) of the vehicle 12 and within sight of the operator of the vehicle 12. The display 34 can be configured to communicate information regarding the operation of the control assembly 26 to the operator of the vehicle 12. The display 34 can be a single warning light or the display can provide additional information to the vehicle operator, such as but not limited to transmission fluid temperature, active/inactive status of the speed reduction control via the controller 28 and/or fault indication of the temperature sensor 30. The display 34 can include an audible indicator with, or in place of, the visual indicator(s) described above.

As stated above, the temperature of the working fluid can be proportional to the speed at which the vehicle 12 travels. That is, at speeds within the exceptionally high speed range, the temperature of the working fluid can approach and/or exceed the threshold temperature. At speeds below the range of exceptionally high speeds, the temperature of the working fluid can be less than the threshold temperature.

FIG. 2 depicts an exemplary algorithm that the ECU 28 can execute to manage the temperature of the working fluid in the transmission 22 by monitoring and adjusting the vehicle speed, $V_V$, to manage the real-time temperature, $T_F$, of the working fluid in relation to the threshold temperature. This algorithm can permit the ECU 28 to selectively adjust a target speed limit, $V_{TARGET}$, and regulate the vehicle speed, $V_V$, based on the real-time temperature, $T_F$, provided by the temperature sensor 30. The ECU 28 can selectively adjust the target speed limit, $V_{TARGET}$, between a value substantially equal to the terminal speed limit, $V_T$, (for example, the drag-limited speed or the governor-limited speed discussed above) and a value substantially equal to a reduced speed limit, $V_R$.

The reduced speed limit, $V_R$, can correspond to a travel speed of the vehicle 12 where the temperature of the working fluid remains less than or substantially equal to the threshold temperature during prolonged travel by the vehicle 12 at the reduced speed limit, $V_R$. Thus, the reduced speed limit, $V_R$, can be less than the terminal speed limit, $V_T$. In an exemplary embodiment, the threshold temperature can be approximately 140° C., the reduced speed limit, $V_R$, can be approximately 120 mph (approximately 190 kph), and the terminal speed limit, $V_T$, can be approximately 130 mph (approximately 209 kph).

When the ECU 28 determines that the real-time temperature, $T_F$, of the working fluid is less than or substantially equal to the threshold temperature, the ECU 28 can select the terminal speed limit, $V_T$, as the target speed limit, $V_{TARGET}$, and can limit the vehicle speed, $V_V$, to the terminal speed limit, $V_T$, until the real-time temperature, $T_F$, exceeds the threshold temperature. When the ECU 28 determines that the real-time temperature, $T_F$, of the working fluid is greater than the threshold temperature, the ECU 28 can select the reduced speed limit, $V_R$, as the target speed limit, $V_{TARGET}$, and can limit the vehicle speed, $V_V$, to the reduced speed limit, $V_R$, until the real-time temperature, $T_F$, falls below the threshold temperature.

By reducing and selectively maintaining the speed of the vehicle 12 at or below the reduced speed limit, $V_R$, the ECU 28 can minimize the amount of working fluid discharged via the breather port of the transmission 22. After the real-time temperature, $T_F$, decreases sufficiently, this exemplary algorithm can permit the ECU 28 to reselect the terminal speed limit, $V_T$, as the target speed limit, $V_{TARGET}$, and can limit the vehicle speed, $V_V$, to the terminal speed limit, $V_T$.

FIG. 2 shows an exemplary algorithm for which the ECU28 can follow. The ECU 28 can begin this temperature management algorithm at step S100 of the flowchart of FIG. 2. From step S100, the ECU 28 can proceed to step S102.

At step S102, the ECU 28 can obtain data from the temperature sensor 30 that can indicate whether or not the temperature sensor 30 is operating within a prescribed specification. Either the ECU 28 or the temperature sensor 30 can be configured to diagnose a fault condition (i.e., actual or probable operation outside of the prescribed specification) for the temperature sensor 30. If the ECU 28 determines at step S102 that the temperature sensor 30 is operating under the fault condition, then the ECU 28 can limit the vehicle speed, $V_V$, to the reduced speed, $V_R$, until the temperature sensor 30 resumes operations within the prescribed specification. Thus, the ECU 28 can minimize the amount of working fluid discharged via the breather port when the temperature sensor 30 operates outside of its design specification.

In particular, if the ECU 28 determines at step S102 that the temperature sensor 30 is operating under the fault condition, then the ECU 28 can proceed to step S104. At step S104, the ECU 28 can set the value of the target speed limit, $V_{TARGET}$, to substantially equal the value of the reduced speed limit, $V_R$.

Then the ECU 28 can proceed to step S106 where the ECU 28 can signal the display 34 to indicate the fault condition of the temperature sensor 30. This signal from the ECU 28 can cause the display to produce an audible output, a visual output, or a combination of an audible output and a visual output. Then the ECU 28 can proceed to step S108.

At step S108, the ECU 28 can follow an algorithm that can permit the ECU 28 to monitor and adjust, if necessary, the vehicle speed, $V_V$, to remain less than the target speed limit, $V_{TARGET}$. In an exemplary embodiment, this speed control algorithm can permit the ECU 28 to compare the vehicle speed, $V_V$, to the target speed limit, $V_{TARGET}$. If the ECU 28 determines that the vehicle speed, $V_V$, is greater than or equal to the target speed limit, $V_{TARGET}$, the algorithm permits the ECU 28 (or another appropriate ECU) to generate a signal that can cause the power source 20 and/or the transmission 22 to reduce the respective torque output(s) so that the vehicle speed, $V_V$, decreases below the target speed limit, $V_{TARGET}$. After the ECU 28 reduces the vehicle speed, $V_V$, below the target speed limit, $V_{TARGET}$, this speed control algorithm can permit the ECU 28 to continue to monitor the vehicle speed, $V_V$. This continual monitoring can permit the ECU to maintain the vehicle speed, $V_V$, below the target speed limit, $V_{TARGET}$.

The speed control algorithm can also permit the ECU 28 to issue a signal that reduces and/or interrupts the fuel or electrical energy supply to the power source 20 in order to limit the torque output by the power source 20. Alternatively, or additionally, this signal can include a component that alters the gear ratio selection process of the transmission 22 in order to limit the torque output by the transmission 22.

Any change in the torque output by the power source 20 and/or the transmission 22 can be gradual or abrupt. That is, if the target torque output is substantially different from the current torque output, the ECU 28 can signal the power source 20 and/or the transmission 22 to reduce the respective torque output in increments until the target torque output is produced. Alternatively, the ECU 28 can signal the power source 20 and/or the transmission 22 to reduce the respective torque output directly to the target torque output.

In an exemplary embodiment of this speed control algorithm, the ECU 20 can use a proportional-integral-derivative (PID) algorithm to regulate the torque output of the power source 20 and/or the transmission 22 in order to regulate the vehicle speed, $V_V$. This PID algorithm permits the ECU 20 to generate a signal that causes appropriate one(s) of the power source 20 and the transmission 22 to gradually reduce respective torque output to the reduced target torque output. This gradual reduction of the torque output can minimize and/or prevent a drastic change in speed and/or acceleration. Thus, the operator and/or any passenger(s) can perceive a relatively smooth intervention, or may they not perceive any intervention, by the control assembly 26.

During this speed control algorithm, the ECU 28 can compare the data from the shaft speed sensor 32 to the target speed limit, $V_{TARGET}$. This comparison can be advantageous in the selection of the target torque output for the power source 20 and/or the transmission 22.

The ECU 28 can then proceed to step S110, where the ECU 28 exits from the temperature management algorithm.

If the ECU 28 determines at step S102 that the temperature sensor 30 is operating under a nominal condition, i.e., within the design specification of the temperature sensor 30, then the ECU 28 can proceed to step S112. At step S112, the ECU 28 can compare the data from the temperature sensor 30 to an upper threshold. This upper threshold can correspond to the temperature threshold discussed above.

If the ECU 28 determines at step S112 that the data from the temperature sensor 30, which data can be indicative of the real-time temperature, $T_F$, is less than or substantially equal to the upper threshold, then the ECU 28 can determine that vehicle speed, $V_V$, need not be limited to the reduced maximum speed, $V_R$. Thus, the ECU 28 can proceed to step S114 where the ECU 28 can set the target speed limit, $V_{TARGET}$, to be substantially equal to the terminal speed, $V_T$.

From step S114, the ECU 28 can proceed to steps S108 and S110, as described above.

If the ECU 28 determines at step S112 that the data from the temperature sensor 30 indicates a temperature $T_F$ that is greater than the upper threshold, then the ECU 28 can determine that vehicle speed, $V_V$, should be limited to the reduced maximum speed, $V_R$. Thus, the ECU 28 can proceed to step S116 where the ECU 28 can set the target speed limit, $V_{TARGET}$, to be substantially equal to the reduce speed limit, $V_R$.

From step S116, the ECU 28 can proceed to step S118 where the ECU 28 follows an algorithm that permits the ECU 28 to monitor and adjust, if necessary, the vehicle speed, $V_V$, to remain less than the target speed limit, $V_{TARGET}$. This algorithm can be the same algorithm discussed above with respect to step S108.

After each iteration of the speed limiting algorithm of step S118, the ECU 28 can proceed to step S120. At step S120, the ECU 28 can determine if the speed limiting algorithm has been effective to reduce the real-time temperature, $T_F$, of the working fluid below the temperature threshold. Here, the ECU 28 can compare the data from the temperature sensor 30 to a lower threshold. This lower threshold can be any appropriate value less than or substantially equal to the temperature threshold. In an exemplary embodiment, the lower threshold can be 100-130° C.

If the ECU 28 determines at step S120 that the data from the temperature sensor 30 is less than the lower threshold, then the ECU 28 can proceed to step S114, step S108 and step S110, in a manner similar to that discussed above.

If the ECU 28 determines at step S120 that the data from the temperature sensor 30 is greater than or substantially equal to the lower threshold, then the ECU 28 can return to step S118 and execute another iteration of the speed limiting algorithm where the target speed limit, $V_{TARGET}$, remains substantially equal to the reduced speed limit, $V_R$.

Thus, the control system 26 can regulate traveling speed of the vehicle 12 to maintain the real-time temperature, $T_F$, and consequently the real-time pressure, of the working fluid below a value that can minimize the amount of working fluid discharged from the transmission 22 via the breather port due to excess fluid pressure. Thus, the time and cost for maintenance of the vehicle 12 can be reduced and the performance, quality, reliability and durability of the vehicle 12 can be enhanced.

Other vehicle control systems, such as but not limited to a cruise control system or an electronic speed governor system can use a PID algorithm to generate a torque limiting signal for the power source 20 and/or the transmission 22. Thus, the control system 26 can regulate the traveling speed of the vehicle 12 by selectively modifying a parameter of a speed control function of another control system such as but not limited to the cruise control system or the electronic speed governor system. In particular, the control system 26 can initiate this other speed control function with a modified value of the target speed limit for this other speed control function. Thus, complexity, weight, cost and assembly time for the control system 26 can be minimized while maximizing reliability and versatility.

The exemplary algorithm depicted in FIG. 2 can be modified by inserting step(s) intermediate to any of the step(s) depicted therein, as appropriate. Further, any appropriate sequencing of the steps depicted in FIG. 2 can be utilized, and certain steps can be removed without departing from the spirit and scope of the disclosed subject matter.

FIG. 1 illustrates one possible embodiment of the vehicle 12. Other embodiments of the vehicle 12 not previously mentioned are also possible. Some exemplary alternate configurations of the vehicle 12 are described below.

The pair of front wheels 14L, 14R and/or the pair of rear wheels 16L, 16R can be pivotally mounted relative to the main body to permit an operator of the vehicle 12 to steer the vehicle 12 along a desired path of travel. In the exemplary embodiment of FIG. 1, the pair of front wheels 14L, 14R are configured to receive the steering input from the operator of the vehicle 12.

The power source 20 can be an internal combustion engine, an electric motor, a hybrid of an internal combustion engine and an electric motor, nuclear, fuel cell, or other known power source. The power source 20 configured as an internal combustion engine or a hybrid power source can have its output axis oriented in the longitudinal direction L or in the traverse direction T of the vehicle 12. The power source 20 can be mounted closer to the front of the vehicle 12, closer to the rear of the vehicle 12, or in a central portion of the vehicle 12. Alternatively, the power source 20 can be a single electric motor mounted in a manner as just described or the power source 20 can be a plurality of electric motors, one adjacent each wheel desired to be driven. The power source 20 can also be configured as a transversely-oriented, front-mounted, internal combustion engine.

The transmission 22 can be an automatic transmission, a manual transmission, or a semi-automatic transmission. The transmission 22 can include a plurality of stepped gear ratios or can have continuously variable gear ratios. The transmission 22 can have its output shaft axis oriented in the longitudinal direction L or in the traverse direction T of the vehicle 12. In addition, the transmission 22 can be mounted closer to the front of the vehicle 12, closer to the rear of the vehicle 22, or in a central portion the vehicle 12. The transmission 22 can also be mounted adjacent the power source 20, or the transmission 22 can be spaced from the power source 20. For example, the power source 20 could be configured as a longitudinally-oriented, front-mounted engine, and the transmission 22 could be configured as a transversely-oriented, rear mounted transmission. In the exemplary embodiment of FIG. 1, the transmission 22 is configured as a transversely-oriented, front-mounted transmission positioned adjacent the power source 20.

The powertrain 10 can be configured as a front-wheel drive powertrain, a rear-wheel drive power train, or an all-wheel drive powertrain. In the exemplary embodiment of FIG. 1, the powertrain 10 is configured as a front-wheel drive powertrain in which the driveshafts 24L, 24R transmit the drive torque from the transmission 22 to the pair of front wheels 14L, 14R.

An all-wheel drive configuration of the powertrain 10 can include an additional pair of driveshafts (not shown) and a propeller shaft extending between the transmission 22 and the additional pair of driveshafts. If configured as an all-wheel drive powertrain, the pair of front wheels 14L, 14R or the pair of rear wheels 16L, 16R can be driven by the power source 20 at all times, and the other of the pair of the front wheels 14L, 14R and the pair of rear wheels 16L, 16R can be selectively coupled to the drive output from the power source 20 either by the operator (part-time all-wheel drive) or automatically by a control system (on-demand all-wheel drive).

The ECU 28 can be in direct electrical communication with appropriate components of the engine 20 and the transmission 22. In the exemplary arrangement of FIG. 1, the ECU 28 can be configured to receive data indicative of the operating condition(s) of the engine 20 and the transmission 22 and to issue command(s) to appropriate component(s) of the engine 20 and the transmission 22 to affect their operation and performance. In an alternate embodiment, the ECU 28 can be in electrical communication with a separate ECU (not illustrated) or plurality of ECUs (not illustrated) that is/are in electrical communication with a respective one or both of the power source 20 and the transmission 22.

In place of or in addition to the transmission output shaft speed sensor 32, the control assembly 26 can include a pair of front wheel speed sensors 36L, 36R and/or a pair of rear wheel speed sensors 38L, 38R, as illustrated in FIG. 1. The wheel speed sensors 36L, 36R, 38L, 38R can be mounted on an appropriate portion of the vehicle 12 and configured to detect rotation of the respective wheel 14L, 14R, 16L, 16R (or the respective driveshaft 24L, 24R) and to output data indicative of the rotational speed of the respective wheel 14L, 14R, 16L, 16R. The data from the wheel speed sensors 36L, 36R, 38L, 38R can be used in place of or in addition to the data from the transmission output shaft speed sensor 32 to determine the travel speed, $V_T$, of the vehicle 12. The raw data from the wheel speed sensors 36L, 36R, 38L, 38R can be processed by one or each of the wheel speed sensors 36L, 36R, 38L, 38R or by the ECU 28 to indicate a rotational speed of the respective wheel 14L, 14R, 16L, 16R. The wheel speed sensors 36L, 36R, 38L, 38R can be any sensor capable of providing the appropriate data. The wheel speed sensors 36L, 36R, 38L, 38R can be in electrical communication with the ECU 28, in any manner described above.

The signals from the wheel speed sensors 36L, 36R, 38L, 38R can be averaged, or they can be subject to a minimum function analysis, or another appropriate process can be employed to determine which one (or plurality) of the wheel speed sensors 36L, 36R, 38L, 38R to rely. It is also possible to assign only one of the sensors 36L, 36R, 38L, 38R to provide data indicative of the vehicle travel speed. This assignment can be fixed, randomly selectable, or selected based on some operating condition, such as but not limited to, the fault status of each sensor 36L, 36R, 38L, 38R or the relative magnitudes of the data from each wheel speed sensor 36L, 36R, 38L, 38R or the turning direction of the vehicle 12, or whether the front wheel or wheels 14L, 14R are driving the vehicle 12, or whether the front wheel or wheels 14L, 14R and the rear wheels 16L, 16R are driving the vehicle 12.

Alternatively, the wheels speed sensors 36L, 36R, 38L, 38R can be in electrical communication with an additional controller (not illustrated) that is different from the ECU 28. This additional controller can be in electrical communication with the ECU 28. This additional controller can be utilized to affect a different control system of the vehicle 12, such as, but not limited to, an anti-lock brake system (not illustrated). This additional controller can be configured to receive processed data from the wheel speed sensors 36L, 36R, 38L, 38R or to receive the raw data from the wheel speed sensors 36L, 36R, 38L, 38R and process the raw data to indicate a rotational speed of the respective wheel(s) 14L, 14R, 16L, 16R. Then, this additional controller can electrically communicate the processed data to the ECU 28.

The sensors 30, 32, 36L, 36R, 38L, 38R can be configured with hardware and/or with software, to perform the assigned task(s). Each of the sensors 30, 32, 36L, 36R, 38L, 38R can be configured as a smart sensor such that the sensors 30, 32, 36L, 36R, 38L, 38R can process the raw data collected by the sensors 30, 32, 36L, 36R, 38L, 38R prior to transmission to the ECU 28. Alternatively, the sensors 30, 32, 36L, 36R, 38L, 38R can each be configured as a simple sensor that passes the raw data directly to the ECU 28 without any manipulation of the raw data. The sensors 30, 32, 36L, 36R, 38L, 38R can be configured to send data to the ECU 28, with or without a prompt from the ECU 28.

While certain embodiments of the disclosed subject matter are described above, it should be understood that the disclosed subject matter can be embodied and configured in many different ways without departing from the spirit and scope of the disclosed subject matter. For example, The ECU 28 can be configured to generate and issue a cruise control speed signal(s) and/or a governor-limited speed signal(s) to the power source 20 and/or the transmission 22.

In an another exemplary embodiment contemplated as part of the disclosed subject matter, the ECU 28 can be configured to generate and issue a cruise control speed signal(s) and/or a governor-limited speed signal(s) to another ECU(s) of the vehicle 12, which other ECU(s) can then pass the signal(s) on to the power source 20 and/or the transmission 22.

In yet another contemplated exemplary embodiment, the driveshafts can be replaced with different torque transmission arrangement such as but not limited to chain drive, a belt drive or a gear train. In another exemplary embodiment, the main body can be omitted completely such as with a racing go-kart, tractor, ATZV, or dune buggy.

In another embodiment, the main body might not include a passenger compartment and display 34. And, the operator controls, operator seat and/or any passenger seating may be external to the main body such as with a motorcycle, an all-terrain vehicle, or an off-road construction vehicle.

In another exemplary embodiment, the vehicle can have more or less than four wheels and any number of the wheels from one to the total count can be driven by the power source.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for managing a temperature of a working fluid in a vehicle powertrain, the vehicle powertrain including a power source configured to output torque and a transmission including a plurality of gear ratios and the working fluid, the transmission selectively coupled to the power source and configured to utilize a selected one of the plurality of gear ratios to selectively multiply and output the torque from the power source, the system comprising:

a temperature sensor in thermal contact with the working fluid and configured to output data indicative of a real-time temperature of the working fluid; and a controller in electrical communication with the temperature sensor and at least one of the power source and the transmission, the controller configured to, compare the data from the temperature sensor to a temperature threshold, select a terminal speed limit when the data indicates that real-time temperature is less than or substantially equal to the temperature threshold, the terminal speed limit is independent of the selected one of the plurality of gears, select a reduced speed limit when the data indicates that real-time temperature is greater than the temperature threshold, wherein the reduced speed limit is less than the terminal speed limit and the reduced speed limit is independent of the selected one of the plurality of gears, and limit the torque output by at least one of the power source and the transmission to limit the speed of the vehicle to the selected one of the terminal speed limit and the reduced speed limit.

2. The system for managing a temperature of a working fluid in a vehicle powertrain according to claim 1, wherein the controller is further configured to,
compare the data from the temperature sensor to a second temperature threshold after the controller selects the reduced speed limit, wherein the second temperature threshold is less than the temperature threshold, and
select the terminal speed limit when the data indicates that real-time temperature is less than the second temperature threshold.

3. The system for managing a temperature of a working fluid in a vehicle powertrain according to claim 1, wherein the controller is further configured to,
compare the data from the temperature sensor to a second temperature threshold after the controller selects the reduced speed limit, wherein the second temperature threshold is less than the temperature threshold, and
select the reduced speed limit when the data indicates that real-time temperature is greater than or substantially equal to the second temperature threshold.

4. The system for managing a temperature of a working fluid in a vehicle powertrain according to claim 1, further comprising:
at least one speed sensor in electrical communication with the controller and configured to output data indicative of a speed of the vehicle,
wherein the controller is configured to,
compare the data from the speed sensor with the reduced speed limit, and
limit the torque output by signaling the at least one of the power source and the transmission to gradually reduce the speed of the vehicle if the data from the speed sensor indicates that the speed of the vehicle is greater than the reduced speed limit.

5. The system for managing a temperature of a working fluid in a vehicle powertrain according to claim 1, wherein the controller is further configured to,
determine one of a nominal condition and a fault condition of the temperature sensor; and
select the reduced maximum speed limit when the controller determines the fault condition.

6. The system for managing a temperature of a working fluid in a vehicle powertrain according to claim 5, further comprising:
a display in electrical communication with the controller, wherein the controller is configured to signal the display to issue at least one of a visual message and an audible message when the controller determines the fault condition.

7. The system for managing a temperature of a working fluid in a vehicle powertrain according to claim 5, wherein the controller is configured to compare the data from the temperature sensor to the temperature threshold when the controller determines the nominal condition.

8. The system for managing a temperature of a working fluid in a vehicle powertrain according to claim 1, wherein the controller is configured to limit the torque output by,
determining a target torque output for the at least one of the power source and the transmission; and
incrementally reducing the torque output of the at least one of the power source and the transmission to the target torque output in accordance with a proportional-integral-derivative analysis.

9. A method for managing a temperature of a working fluid in a vehicle powertrain, the vehicle powertrain including a power source configured to output torque, a transmission including a plurality of gear ratios and the working fluid, and a controller, the transmission selectively coupled to the power source and configured to utilize a selected one of the plurality of gear ratios to selectively multiply and output the torque from the power source, and the controller configured to receive data, process the data, and output a signal based on data processing, the method comprising:
obtaining data indicative of a real-time temperature of the working fluid;
using the controller to compare the data to a temperature threshold;
using the controller to select a terminal speed limit when the data is less than or substantially equal to the temperature threshold, the terminal speed limit is independent of the selected one of the plurality of gears;
using the controller to select a reduced speed limit when the data indicates that real-time temperature is greater than the temperature threshold, wherein the reduced speed limit is less than the terminal speed limit and the reduced speed limit is independent of the selected one of the plurality of gears; and
using the controller to limit the torque output by at least one of the power source and the transmission to limit the speed of the vehicle to the selected one of the terminal speed limit and the reduced speed limit.

10. The method for managing a temperature of a working fluid in a vehicle powertrain according to claim 9, further comprising:
using the controller to compare the data to a second temperature threshold after selecting the reduced speed limit, wherein the second temperature threshold is less than the temperature threshold; and
using the controller to select the terminal speed limit when the data indicates that real- time temperature is less than the second temperature threshold.

11. The method for managing a temperature of a working fluid in a vehicle powertrain according to claim 9, further comprising:
using the controller to compare the data to a second temperature threshold after selecting the reduced speed limit, wherein the second temperature threshold is less than the temperature threshold; and
using the controller to select the reduced speed limit when the data indicates that real-time temperature is greater than or substantially equal to the second temperature threshold.

12. The method for managing a temperature of a working fluid in a vehicle powertrain according to claim 9, further comprising:
obtaining data indicative of a speed of the vehicle; and
using the controller to compare the speed data to the reduced speed limit,
wherein using the controller to limit the torque output includes signaling the at least one of the power source and the transmission to gradually reduce the speed of the vehicle if the speed data indicates that the speed of the vehicle is greater than the reduced speed limit.

13. The method for managing a temperature of a working fluid in a vehicle powertrain according to claim 9, further comprising:
using the controller to determine one of a nominal condition and a fault condition of the temperature data; and
using the controller to select the reduced maximum speed limit when the fault condition is determined.

14. The method for managing a temperature of a working fluid in a vehicle powertrain according to claim 13, further comprising:

issuing at least one of a visual message and an audible message when the fault condition is determined.

15. The method for managing a temperature of a working fluid in a vehicle powertrain according to claim 13, wherein using the controller to compare the data to the temperature threshold includes comparing the data to the temperature threshold when the nominal condition is determined.

16. The method for managing a temperature of a working fluid in a vehicle powertrain according to claim 9, wherein using the controller to limit the torque output includes, determining a target torque output, and incrementally reducing the torque output of at least one of the power source and the transmission to the target torque output in accordance with a proportional-integral-derivative analysis.

* * * * *